United States Patent
Son et al.

(10) Patent No.: US 8,300,181 B2
(45) Date of Patent: Oct. 30, 2012

(54) METHOD OF FABRICATING LIQUID CRYSTAL DISPLAY AND LIQUID CRYSTAL DISPLAY OBTAINED BY THE METHOD

(75) Inventors: Jong-Ho Son, Seoul (KR); Seung-Beom Park, Seoul (KR); Myeong-Ha Kye, Seoul (KR); Hoon Kim, Ansan-si (KR); Min-Goo Seok, Yongin-si (KR); Seon-Ah Cho, Busan (KR)

(73) Assignee: Samsung Display Co., Ltd., Yongin (KR)

( * ) Notice: Subject to any disclaimer, the term of this patent is extended or adjusted under 35 U.S.C. 154(b) by 552 days.

(21) Appl. No.: 12/573,386

(22) Filed: Oct. 5, 2009

(65) Prior Publication Data
US 2010/0123859 A1    May 20, 2010

(30) Foreign Application Priority Data
Nov. 20, 2008   (KR) ........................ 10-2008-0115764

(51) Int. Cl.
*G02F 1/1333*    (2006.01)
(52) U.S. Cl. .......................... 349/93; 349/187
(58) Field of Classification Search .................. None
See application file for complete search history.

(56) References Cited

U.S. PATENT DOCUMENTS
6,529,252 B2 * 3/2003 Nakao et al. .................... 349/86
2003/0071952 A1 * 4/2003 Yoshida et al. ............... 349/141

FOREIGN PATENT DOCUMENTS
| JP | 2005181582 | 7/2005 |
| JP | 2006078968 | 3/2006 |
| KR | 1020060048335 | 5/2006 |

* cited by examiner

*Primary Examiner* — Lucy Chien
(74) *Attorney, Agent, or Firm* — H.C. Park & Associates, PLC

(57) ABSTRACT

A method of fabricating liquid crystal display (LCD) that may improves picture quality by removing uncured monomers in a liquid crystal panel and an LCD obtained by the method are provided. The method includes forming a liquid crystal layer between a first substrate and a second substrate by injecting liquid crystal molecules and monomers between the first substrate and the second substrate, the first and second substrates facing each other; applying an electric field to the liquid crystal layer; performing a primary curing operation on the monomers; and removing the electric field and performing a secondary curing operation on remaining monomers, wherein at least one of the primary curing operation and the secondary curing operation includes maintaining a temperature of the liquid crystal layer below a phase transition temperature of the liquid crystal molecules.

17 Claims, 8 Drawing Sheets

10

10

METHOD OF FABRICATING LIQUID CRYSTAL DISPLAY AND LIQUID CRYSTAL DISPLAY OBTAINED BY THE METHOD

CROSS-REFERENCE TO RELATED APPLICATION

This application claims priority from and the benefit of Korean Patent Application No. 10-2008-0115764, filed on Nov. 20, 2008, which is hereby incorporated by reference for all purposes as if fully set forth herein.

BACKGROUND OF THE INVENTION

1. Field of the Invention

The present invention relates to a method of fabricating a liquid crystal display (LCD) and an LCD obtained by the method, and more particularly, to a method of fabricating an LCD which can improve picture quality by removing uncured monomers in a liquid crystal panel and an LCD obtained by the method.

2. Discussion of the Background

In recent years, the demand for flat panel displays such as a plasma display panel (PDP), a plasma-addressed liquid crystal (PALC) display, a liquid crystal display (LCD) and an organic light-emitting diode (OLED) has increased dramatically since conventional cathode ray tube (CRT) devices are insufficient to meet the demand for the development of thin and large-scale display devices.

Display devices generally include a lower display panel having a plurality of thin-film transistors (TFTs) arranged thereon, an upper display panel facing the lower display panel, and a liquid crystal layer interposed between the lower display panel and the upper display panel, and display an image by adjusting the intensity of an electric field applied to the liquid crystal layer.

LCDs are easy to implement as thin displays, consume less power, and rarely generate electromagnetic waves. However, LCDs have relatively poor lateral visibility compared with front visibility. In order to address this problem, various liquid crystal alignment modes and various methods of driving LCDs have been suggested. Particularly, as part of the effort to realize a wide viewing angle, a patterned vertical-alignment (PVA) mode LCD having cutouts for defining domains and an in-plane switching (IPS) mode LCD have been developed.

In the PVA mode LCD, an upper substrate or a lower substrate may be patterned. Thus, if the upper substrate and the lower substrate are misaligned, the aperture ratio of the PVA mode LCD may decrease. In order to address this problem, a non-patterned transparent electrode may be formed on the upper substrate.

In order to stably maintain domains in a liquid crystal panel, liquid crystal molecules may be pre-tilted toward a predetermined direction. For this, a liquid crystal layer may be formed by injecting molecules and monomers between the upper substrate and the lower substrate, and then, the liquid crystal layer may be cured. However, the monomers mixed in the liquid crystal layer may cause afterimages. Therefore, it is desirable to develop an LCD capable of preventing afterimages from being generated by monomers.

SUMMARY OF THE INVENTION

The present invention provides a method of fabricating a liquid crystal display (LCD) that may improve picture quality by removing uncured monomers in a liquid crystal panel.

The present invention also provides an LCD obtained by the method.

Additional features of the invention will be set forth in the description which follows, and in part will be apparent from the description, or may be learned by practice of the invention The present invention discloses a method of fabricating an LCD, the method comprising: forming a liquid crystal layer between a first substrate and a second substrates by injecting liquid crystal molecules and monomers, the first substrate and second substrate facing each other; applying an electric field to the liquid crystal layer; performing a primary curing operation on the monomers; and removing the electric field and performing a secondary curing operation on the monomers, wherein at least one of the performing of the primary curing operation and the performing of the secondary curing operation comprises curing the monomers while maintaining the temperature of the liquid crystal layer below a phase transition temperature of liquid crystal molecules.

The present invention also discloses a method of fabricating an LCD, the method including: forming a liquid crystal layer between a first substrate and a second substrate by injecting liquid crystal molecules and monomers, the first substrate and second substrate facing each other; applying an electric field to the liquid crystal layer; performing a primary curing operation on the monomers; and removing the electric field and performing a secondary curing operation on the monomers, wherein at least one of the performing of the primary curing operation and the performing of the secondary curing operation comprises curing the monomers while maintaining the liquid crystal in a nematic state.

The present invention also discloses a liquid crystal display (LCD) including: a first substrate; a second substrate facing the first substrate; and a liquid crystal layer interposed between the first and second substrates and including copolymers formed by injecting monomers into the liquid crystal layer, applying an electric field to the liquid crystal layer, performing a primary curing operation on the monomers, removing the electric field, and performing a secondary curing operation on the monomers, wherein at least one of the primary and secondary curing operations is performed while maintaining the liquid crystal layer to have a nematic state.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
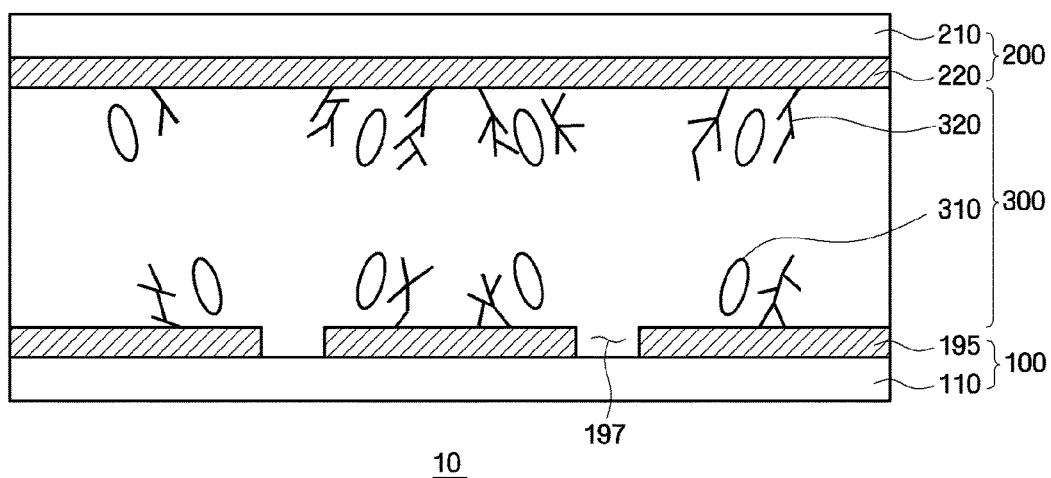
FIG. 1 is a cross-sectional view of a liquid crystal display (LCD) according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present. A liquid crystal display (LCD) according to an exemplary embodiment of the present invention will hereinafter be described in detail with reference to FIG. 1.

FIG. 1 is a cross-sectional view of an LCD 10 according to an exemplary embodiment of the present invention. Referring to FIG. 1, liquid crystal molecules 310 included in a liquid crystal layer 300 may be pre-tilted due to copolymers 320. More specifically, the LCD 10 may include an upper display panel 200, a lower display panel 100, and the liquid crystal layer 300 interposed between the upper display panel 200 and the lower display panel 100. The upper display panel 200 and the lower display panel 100 may face each other.

The upper display panel 200 and the lower display panel 100 may be spaced apart from each other. An electric field may be applied between the upper display panel 200 and the lower display panel 100 in order to rotate the liquid crystal molecules 310.

The lower display panel 100 may include a pixel electrode 195 to which a data voltage is applied. The pixel electrode 195 may be electrically connected to a thin-film transistor (TFT, not shown) formed on a first substrate 110. The data voltage may be applied to the pixel electrode 195 according to a switching operation performed by the TFT.

The upper display panel 200 may include a common electrode 220 to which a common voltage is applied. The common voltage and the data voltage applied to the common electrode 220 and the pixel electrode 195, respectively, generate an electric field, which rotates the liquid crystal molecules 310. The common electrode 220 and the pixel electrode 195 may both be formed as transparent electrodes. The common electrode 220 may be formed on the second substrate 210, and the pixel electrode 195 may be formed on the first substrate 110. Alternatively, the common electrode 220 and the pixel electrode 195 may both be formed on the first substrate 110.

The pixel electrode 195 may include a plurality of domain-dividing units 197. The domain-dividing units 197 may divide a pixel region into a plurality of domains. The direction in which the liquid crystal molecules 310 are tilted may be controlled using the domains. For example, the liquid crystal molecules 310 may be tilted vertically with respect to the domain-dividing units 197. In this manner, the liquid crystal molecules 310 may be tilted in various directions using the domain-dividing units 197, thereby providing wide viewing angles. The domain-dividing units 197 may be formed as slits by patterning the pixel electrode 195.

The common electrode 220 may not include any domain-dividing units. The common electrode 220 may be formed by depositing a transparent layer on the second substrate 210 without the need to pattern the transparent layer. In this case, since the common electrode 220 is not patterned, it is possible to reduce the probability that the aperture ratio of the LCD 10 decreases, or defects occur due to misalignment between the upper display panel 200 and the lower display panel 100.

In order to improve the behavioral properties of the liquid crystal molecules 310, the liquid crystal layer 300 may include the copolymers 320, as well as the liquid crystal molecules 310. The copolymers 320 may allow the liquid crystal molecules 310 to have a predetermined pre-tilt angle. Thus, the copolymers 320 may improve the initial behavioral properties of the liquid crystal molecules 310, and they may stabilize the domains defined by the domain-dividing units 197.

The copolymers 320 may be formed by curing monomers under a set of conditions. For example, monomers may be injected into the liquid crystal layer 300, and a primary curing operation may be performed on the monomers by applying an electric field to the liquid crystal layer 300. The electric field may then be removed, and a secondary curing operation may be performed on the monomers, thereby forming the copolymers 320. During the primary and secondary curing operations, the temperature of the liquid crystal layer 300 may be maintained below the phase transition temperature of the liquid crystal molecules 310. The formation of the copolymers 320 in the liquid crystal layer 300 will be described below in further detail.

The copolymers 320 may be generated by polymerizing monomers. More specifically, in order to generate the copolymers 320, the primary curing operation may be performed on monomers so that the monomers can be primarily polymerized and can conform to the shape of the liquid crystal molecules 310 having a predetermined tilt angle due to an electric field. Thereafter, the secondary curing operation may be performed so that uncured monomers can be removed. Here, the secondary curing operation may completely remove any uncured monomers. During the primary and secondary curing operations, the temperature of the liquid crystal layer 300 may be maintained below the phase transition temperature of the liquid crystal molecules 310. The phase transition temperature of the liquid crystal molecules 310 is the temperature at which the liquid crystal molecules 310 transform from a nematic phase to an isotropic phase. The liquid crystal molecules 310 may become isotropic at a temperature higher than the phase transition temperature of the liquid crystal molecules 310.

Therefore, the primary and secondary curing operations may be performed while maintaining the liquid crystal molecules 310 in a nematic phase. If the primary and secondary curing operations are performed at a temperature higher than the phase transition temperature of the liquid crystal molecules 310, defects such as smudges on the screen of the LCD 10 may be generated.

A method of fabricating an LCD according to an exemplary embodiment of the present invention will hereinafter be described in detail with reference to FIG. 1, FIG. 2, FIG. 3, FIG. 4, FIG. 5, FIG. 6, and FIG. 7. FIGS. 2 through 7 are cross-sectional views for explaining a method of fabricating an LCD according to an exemplary embodiment of the present invention.

Figure 2:
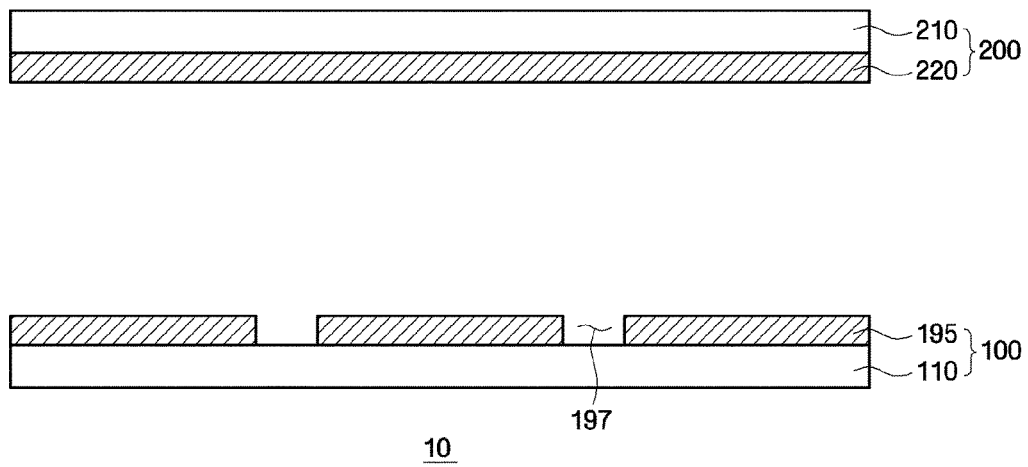
FIG. 2, FIG. 3, FIG. 4, FIG. 5, FIG. 6, and FIG. 7 are cross-sectional views for explaining a method of fabricating an LCD according to an exemplary embodiment of the present invention.

Referring to FIG. 2, the upper display panel 200 and the lower display panel 100 may be aligned to face each other. More specifically, the upper display panel 200 including the second substrate 210 and the common electrode 220 may be disposed over the lower display panel 100 including the first substrate 110, which includes a TFT (not shown) and the pixel electrode 195. The upper display panel 200 and the lower display panel 100 may be aligned so that the common electrode 220 and the pixel electrode 195 can face each other. The upper display panel 200 and the lower display panel 100 may be aligned a predetermined distance apart from each other in order to form the liquid crystal layer 300 of FIG. 1 between the upper display panel 200 and the lower display panel 100.

The common electrode 220 and the pixel electrode 195 may be formed of a transparent material such as indium tin oxide (ITO) or indium zinc oxide (IZO). The pixel electrode 195 may include the domain-dividing units 197.

Figure 3:
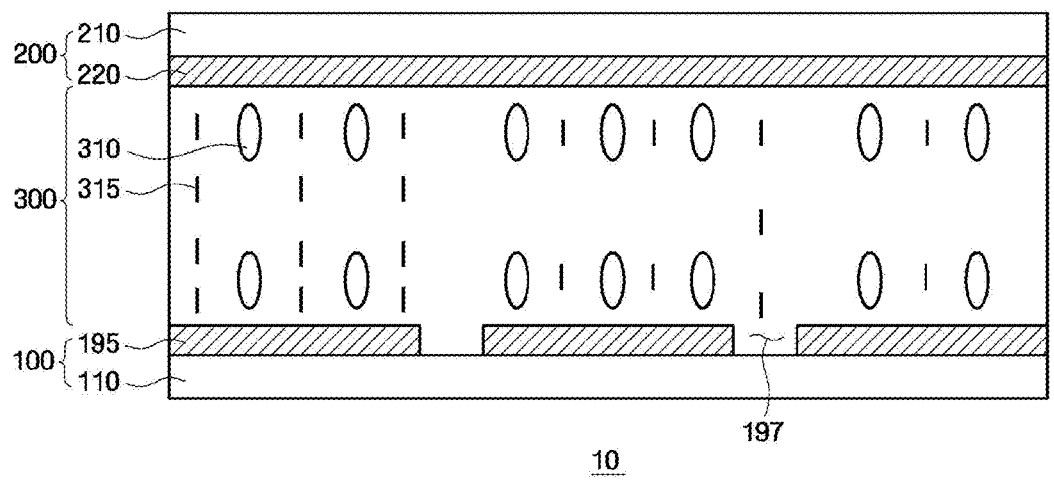

Next, referring to FIG. 3, the liquid crystal layer 300 may be formed by injecting the liquid crystal molecules 310 and monomers 315 into the empty space between the upper display panel 200 and the lower display panel 100. The liquid crystal molecules 310 and the monomers 315 may be uniformly mixed in the liquid crystal layer 300. The monomers 315 may be photo-polymerizable monomers or thermally-polymerizable monomers. A material such as acrylate or methacrylate may be used as the monomers 315.

An alignment layer (not shown), which properly aligns the liquid crystal molecules 310 in a predetermined direction, may be formed on each of the upper display panel 200 and the lower display panel 100. The alignment layer may be a vertical alignment layer for initially aligning the liquid crystal molecules 310 vertically with respect to the first and second substrates 110 and 210. The alignment of the liquid crystal molecules 310 may be performed using a rubbing alignment method or an optical alignment method.

Since the monomers 315 are mixed in the liquid crystal layer 300, the monomers 315 may be able to float in the same direction as the alignment direction of the liquid crystal molecules 310.

Figure 4:
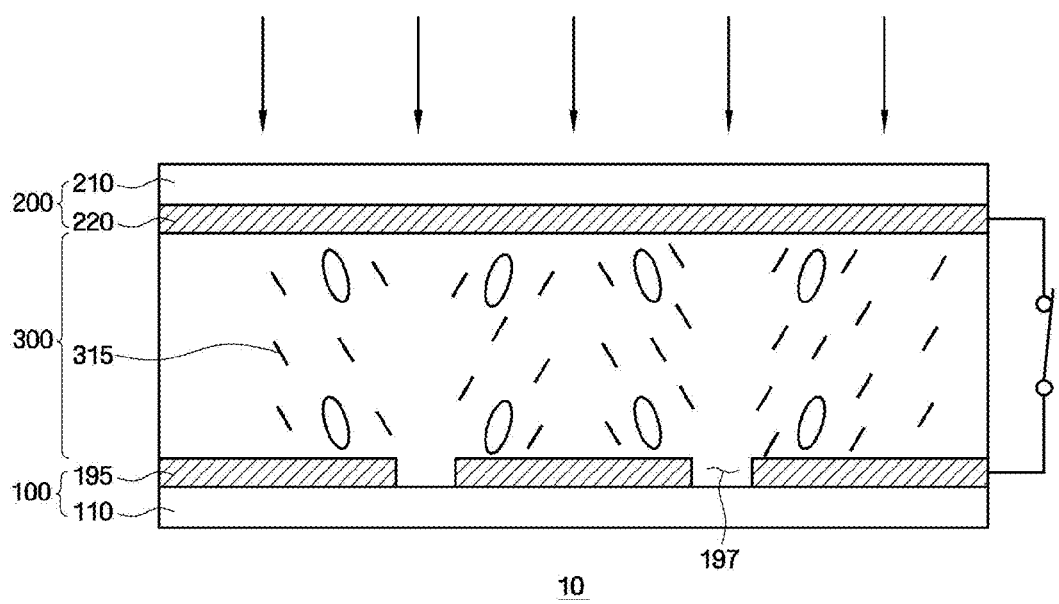

Referring to FIG. 4, a primary curing operation may be performed on the monomers 315 by applying an electric field to the liquid crystal layer 300 and applying ultraviolet (UV) light or heat to the liquid crystal layer 300. More specifically, when a common voltage and a data voltage are applied to the common electrode 220 and the pixel electrode 195, respectively, an electric field is generated between the common electrode 220 and the pixel electrode 195.

Once an electric field is generated between the common electrode 220 and the pixel electrode 195, the liquid crystal molecules 310 may be tilted horizontally with respect to the first and second substrates 110 and 210 due to the electric field.

The liquid crystal molecules 310 may be tilted vertically with respect to the domain-dividing units 197. Then, the monomers 315 may float along the liquid crystal molecules 310 and may thus be tilted. Even though the monomers 315 are shown in FIG. 3 and FIG. 4 as having directivity, the monomers 315 may not necessarily have directivity.

Figure 5:
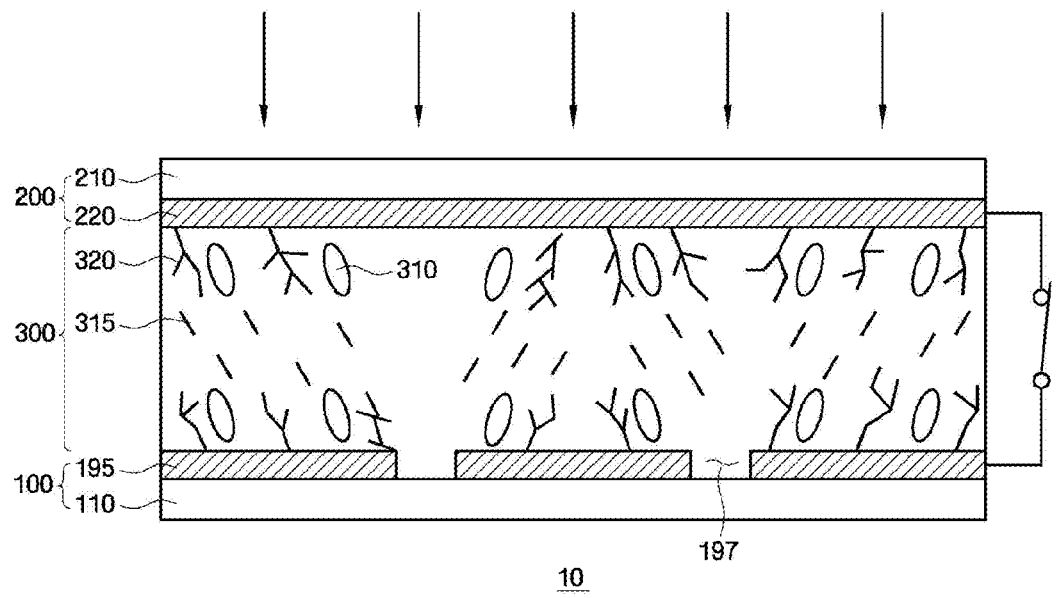

Thereafter, referring to FIG. 5, the primary curing operation may be performed on the monomers 315 while applying the electric field to the liquid crystal layer 300.

If an electric field is applied to the liquid crystal layer 300, the liquid crystal molecules 310 may be tilted vertically with respect to the domain-dividing units 197, and the monomers 315 may float along the liquid crystal molecules 310, conforming to the shape of the liquid crystal molecules 310. Then, if the monomers 315 react with UV light or heat, the copolymers 320 may be generated. The copolymers 320 may be attached onto the first or second substrate 110 and 210 or may float in the liquid crystal layer 300.

The copolymers 320 may allow the liquid crystal molecules 310 to have a predetermined pre-tilt angle and to maintain their shape. The copolymers 320 may be generated by performing photo-polymerization or thermal polymerization on the monomers 315. Since the copolymers 320 have a more rigid coupling structure than the monomers 315, the copolymers 320 may help the liquid crystal molecules 310 have a predetermined pre-tilt angle.

During the primary curing operation, the liquid crystal layer 300 should remain in the nematic phase in order to properly adjust the transmittance of a liquid crystal panel. If the liquid crystal layer 300 remains in the isotropic phase during the primary curing operation, the phase of light may not be able to be adjusted. Thus, the transmittance of a liquid crystal panel may not be able to be properly adjusted. As a result, smudges may be formed on a liquid crystal panel.

In order to maintain the liquid crystal layer 300 in the nematic phase, the temperature of the liquid crystal layer 300 may be appropriately adjusted. For example, if the temperature of the liquid crystal layer 300 is higher than the phase transition temperature of the liquid crystal molecules 310, the liquid crystal layer 300 may not be able to remain in the nematic phase any longer and may become isotropic.

If the monomers 315 are cured when the liquid crystal layer 300 is isotropic, the behavioral properties of the liquid crystal molecules 310 during the driving of a liquid crystal panel may deteriorate. Thus, smudges may form on the liquid crystal panel. The relationship between the temperature of the liquid crystal layer 300 and the occurrence of smudges on a liquid crystal panel will be described below in further detail.

Figure 7:
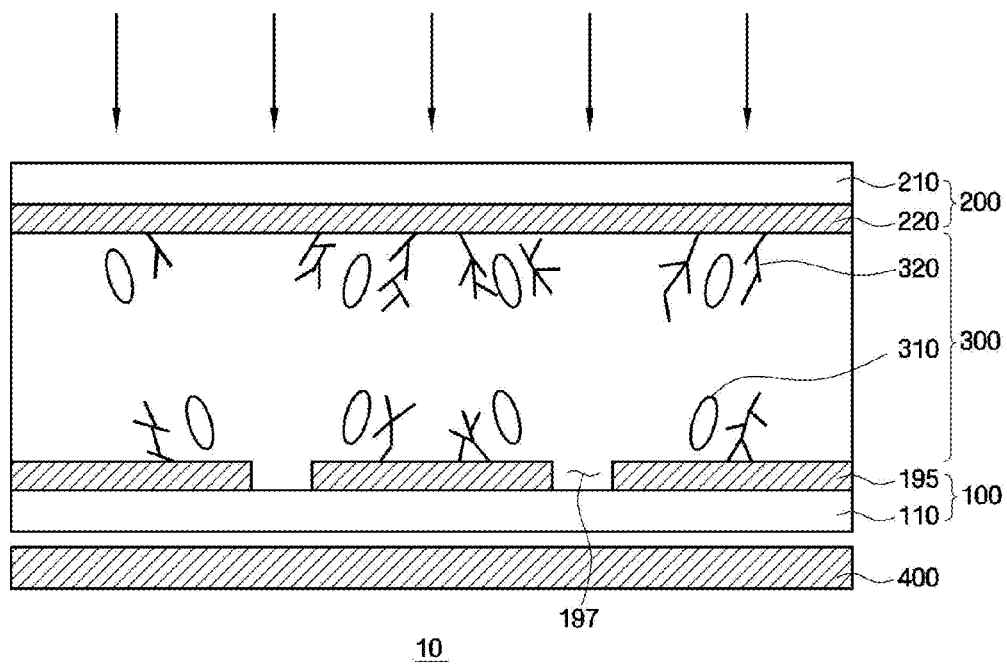

If the monomers 315 are irradiated by UV light or laser light in order to photo-cure the monomers 315, the temperature of the liquid crystal layer 300 may increase. The temperature increase may be detected from all over the liquid crystal layer 300 or only from some parts of the liquid crystal layer 300. Therefore, as shown in FIG. 7, a cooling apparatus 400 may be used to maintain the temperature of the liquid crystal layer 300 below the phase transition temperature of the liquid crystal molecules 310 during the irradiation of the monomers 315. The cooling apparatus 400 may be disposed below the lower display panel 100 and may thus cool down the liquid crystal layer 300 through heat conduction. However, other methods may be used to cool the liquid crystal layer 300. For example, the liquid crystal layer 300 may be cooled by blowing cool air onto the upper or lower display panel 200 or 100.

During the primary curing operation, the temperature of the liquid crystal layer 300 may be maintained below 70-80° C., and particularly, below 50° C.

As a result of the primary curing operation, most of the monomers 315 may be transformed into copolymers 320. However, some of the monomers 315 may still remain, yet to be transformed into copolymers 320. The monomers 315 still remaining in the liquid crystal layer 300 after the primary curing operation may adversely affect the behavior of the liquid crystal molecules 310, and thus, the picture quality of a liquid crystal panel may decrease.

Figure 6:
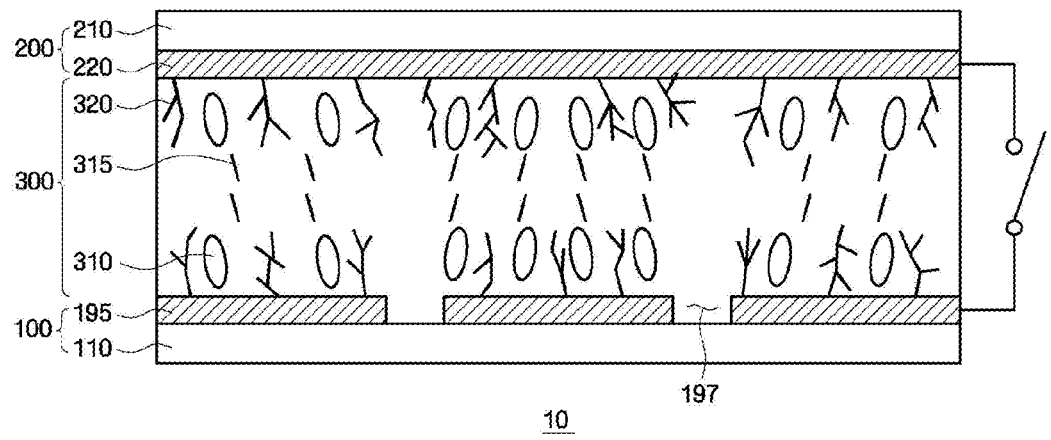

Referring now to FIG. 6, once the primary curing operation is complete, the electric field previously applied to the liquid crystal layer 300 may be removed.

Then, the liquid crystal layer 300 may return to its original alignment state. In this case, the liquid crystal molecules 310 may not be able to return to their initial alignment state, i.e., a vertical alignment state, due to the copolymers 320 obtained by the primary curing operation and may thus maintain a predetermined pretilt angle.

The monomers 315 still remaining in the liquid crystal layer 300 may float along with the liquid crystal molecules 310. The amount of monomers 315 still remaining in the liquid crystal layer 300 may vary according to the amount of UV light or laser light the monomers 315 are exposed to.

Thereafter, referring to FIG. 7, a secondary curing operation may be performed without an electric field being applied to the liquid crystal layer 300.

More specifically, the secondary curing operation may be performed by applying UV light or laser light to the monomers 315 still remaining in the liquid crystal layer 300 when no electric field is applied to the liquid crystal layer 300. As a result of the secondary curing operation, the remaining monomers 315 in the liquid crystal layer 300 may be transformed into copolymers 320.

In short, it is possible to remove smudges, if any, on a liquid crystal panel by performing the secondary curing operation so as to remove the remaining monomers 315 in the liquid crystal layer 300 after the primary curing operation.

During the secondary curing operation, the liquid crystal layer 300 should remain in the nematic phase. That is, in order to remove smudges, if any, on a liquid crystal panel, the monomers 315 remaining in the liquid crystal layer 300 after the primary curing operation should be cured by applying UV light or laser light to the liquid crystal layer 300 while maintaining the liquid crystal layer 300 in the nematic phase.

In order to maintain the liquid crystal layer 300 in the nematic phase, the temperature of the liquid crystal layer 300 should be maintained below the phase transition temperature of the liquid crystal molecules 310. More specifically, during the secondary curing operation, the temperature of the liquid crystal layer 300 may be maintained below 70-80° C., and particularly, below 50° C.

During the secondary curing operation, as in the primary curing operation, the cooling apparatus 400 may be used to maintain the temperature of the liquid crystal layer 300 below the phase transition temperature of the liquid crystal molecules 310.

As a result of the secondary curing operation, the LCD 10 shown in FIG. 1 may be obtained.

Figure 8:
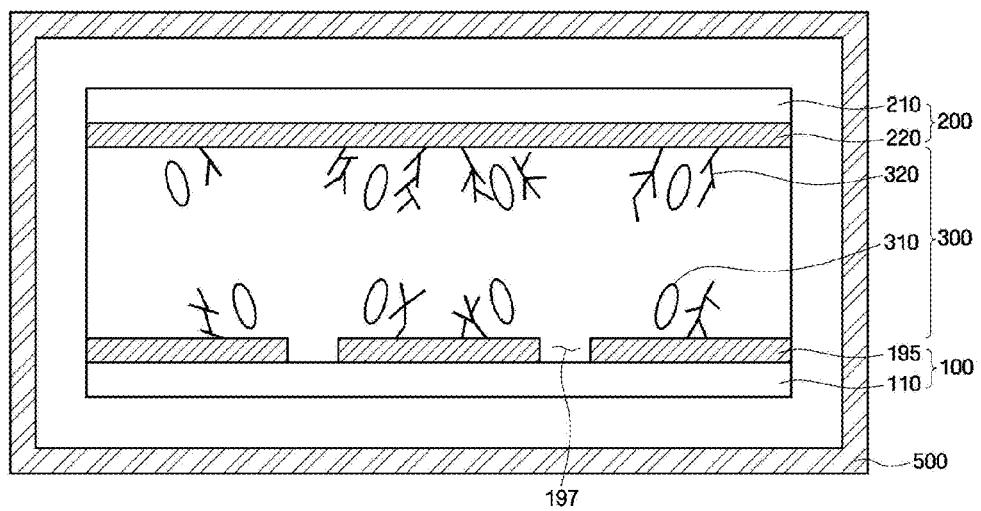
FIG. 8 is a cross-sectional view for explaining a method of fabricating an LCD according to another exemplary embodiment of the present invention.

A method of fabricating an LCD according to another exemplary embodiment of the present invention will hereinafter be described in detail with reference to FIG. 8. FIG. 8 illustrates a cross-sectional view for explaining a method of fabricating an LCD according to another exemplary embodiment of the present invention.

The exemplary embodiment of FIG. 8 is the same as the exemplary embodiment of FIGS. 2-6 except that a thermal curing operation is performed in order to remove monomers 315 still remaining in a liquid crystal layer 300 after a primary curing operation.

Monomers 315 may be transformed into copolymers 320 by being polymerized by light such as UV light or laser light or by being polymerized by heat.

When a primary curing operation is complete, as shown in FIG. 6, an electric field previously applied to a liquid crystal layer 300 may be removed, and a secondary curing operation may be performed by placing the LCD 10 in a chamber 500 and heating the LCD 10. During the secondary curing operation, the liquid crystal layer 300 should remain in the nematic phase. Thus, the temperature in the chamber 500 may be maintained below the phase transition temperature of liquid crystal molecules 310.

More specifically, the temperature in the chamber 500 may be maintained below 70-80° C., and particularly, below 50° C. The duration for which the liquid crystal layer 300 is heated may be longer than the duration for which the liquid crystal layer 300 is irradiated by UV light or laser light, as performed in the exemplary embodiment of FIGS. 2-7.

As a result of the secondary curing operation, the LCD 10 shown in FIG. 1 may be obtained.

The relationship between the temperature at which primary and secondary curing operations are performed and the properties of an LCD obtained by the primary and secondary curing operations will hereinafter be described below with reference to FIG. 9A, FIG. 9B, FIG. 10, and FIG. 11.

Figure 9A:
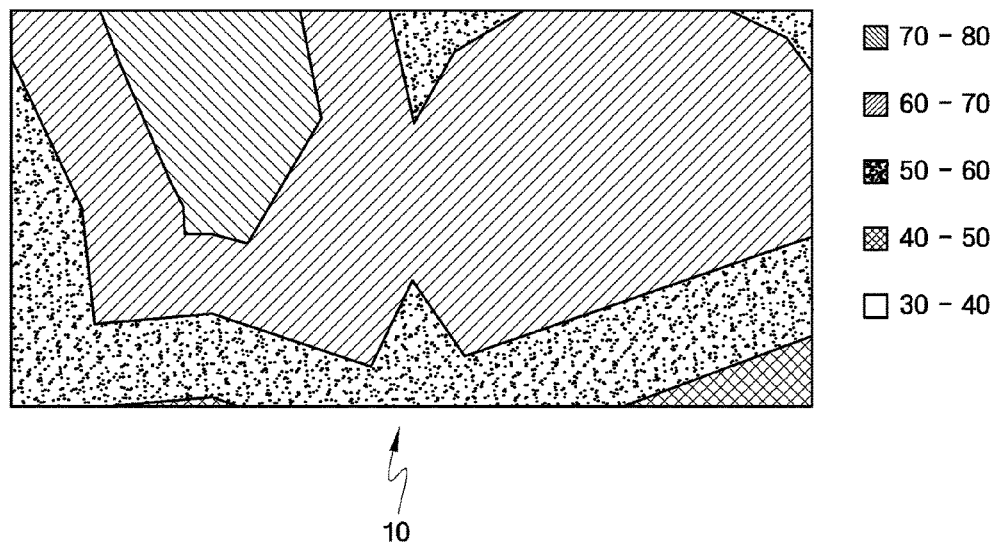
FIG. 9A is a plan view showing the distribution of temperatures on a liquid crystal panel during a curing operation.
Figure 9B:
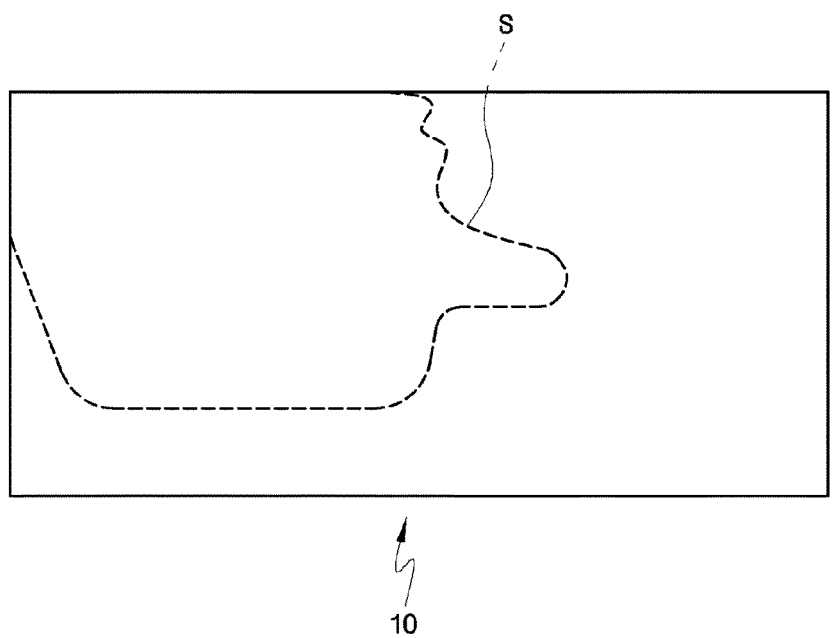
FIG. 9B is a plan view showing the distribution of smudges on a liquid crystal panel after a curing operation.

FIG. 9A is a plan view showing the distribution of temperatures on a liquid crystal panel during a curing operation, and FIG. 9B is a plan view showing the distribution of smudges on the liquid crystal panel after the curing operation.

Referring to FIG. 9A, during a primary or secondary curing operation, the temperature of a liquid crystal panel may increase due to the liquid crystal panel being irradiated by UV light or laser light or due to the liquid crystal panel being heated. The temperature of the liquid crystal panel may be substantially the same as the temperature of a liquid crystal layer included in the liquid crystal panel.

Referring to FIG. 9B, reference character S indicates a smudged area on a liquid crystal panel. Referring to FIG. 9A and FIG. 9B, portions of the liquid crystal panel having a temperature of 70° C. or higher are highly likely to be smudged, whereas portions of the liquid crystal panel having a temperature of 50° C. or lower are less likely to be smudged. Therefore, in order to prevent smudges on a liquid crystal panel, the temperature of a liquid crystal panel should be maintained at 50° C. or lower during primary and secondary curing operations.

Figure 10:
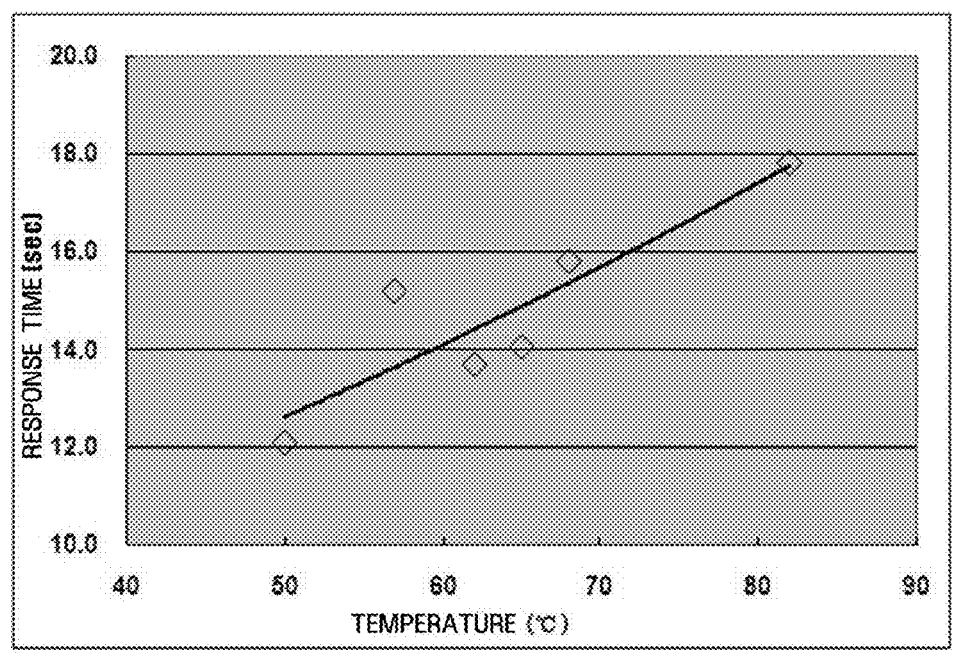
FIG. 10 is a graph showing the relationship between the temperature of a liquid crystal panel during a curing operation and the response time of liquid crystal molecules.

Referring to FIG. 10, the higher the temperature at which primary and secondary curing operations are performed, the longer it takes for liquid crystal molecules to respond. More specifically, it is possible to improve the response speed of liquid crystal molecules by performing the primary and secondary curing operations at a temperature of 50° C. or lower.

Figure 11:
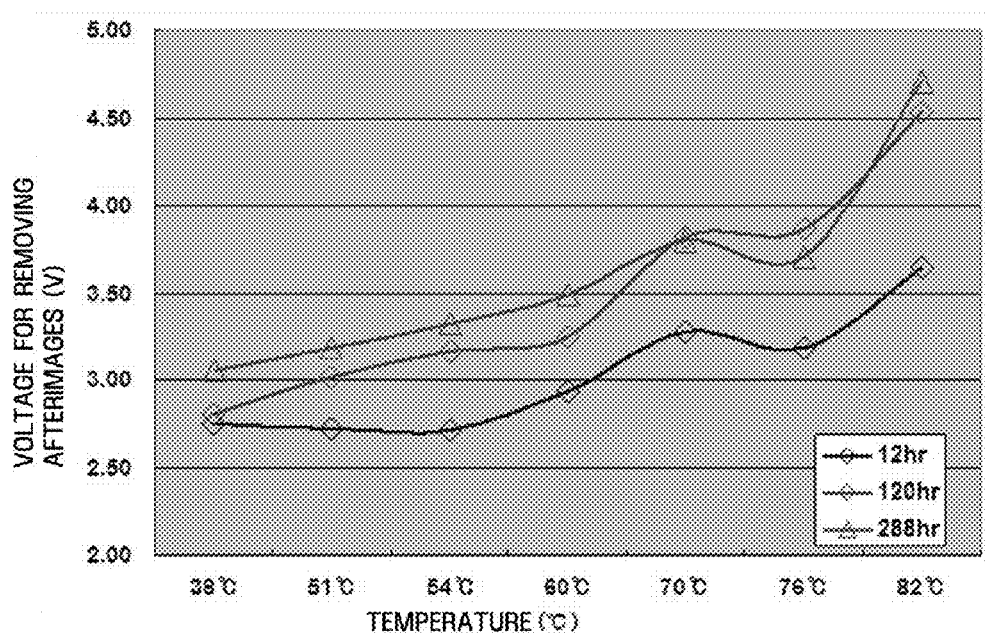
FIG. 11 is a graph showing the relationship between the temperature of a liquid crystal panel during a curing operation and a voltage for removing afterimages from the liquid crystal panel.

Referring to FIG. 11, the higher the temperature at which primary and secondary curing operations are performed, the higher the voltage applied for removing afterimages should be. If the primary and secondary curing operations are performed at a temperature of 70° C. or lower, the voltage for removing after images may considerably lower.

In short, referring to FIG. 10 and FIG. 11, the temperature at which primary and secondary curing operations are performed may considerably affect the behavior of liquid crystal molecules.

Figure 12:
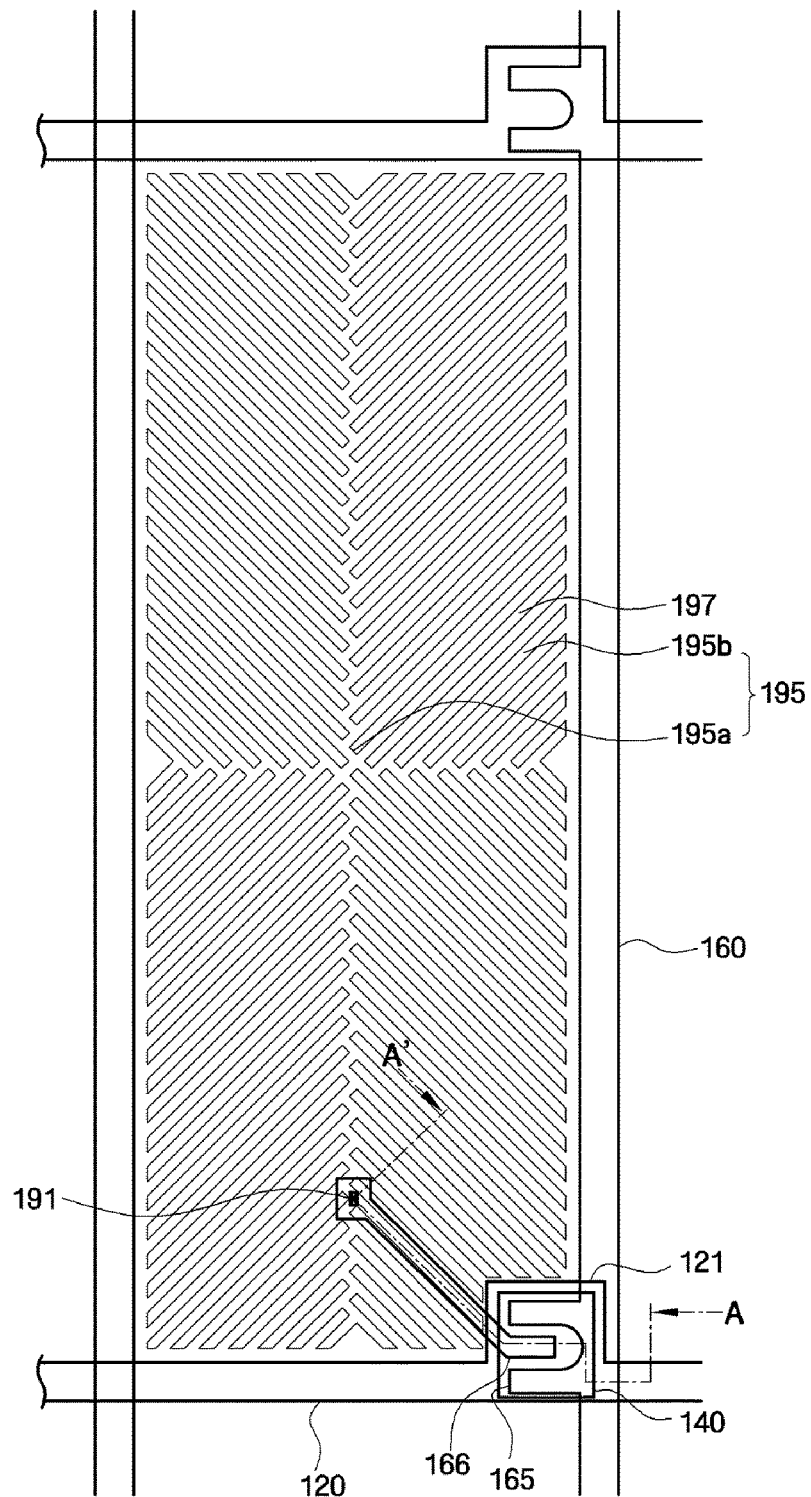
FIG. 12 shows a layout of an LCD according to another exemplary embodiment of the present invention.

An LCD according to another exemplary embodiment of the present invention will hereinafter be described in detail with reference to FIG. 12 and FIG. 13. FIG. 12 is a layout of an LCD 10' according to another exemplary embodiment of the present invention, and FIG. 13 is a cross-sectional view taken along line A-A' of FIG. 12.

Figure 13:
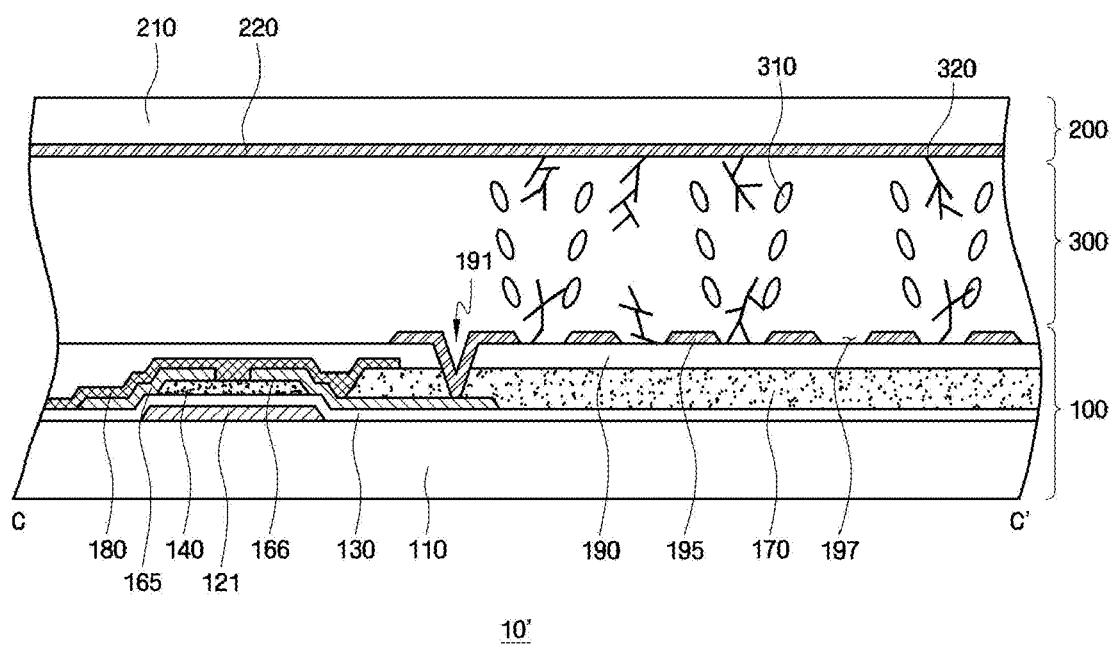
FIG. 13 is a cross-sectional view taken along line A-A' of FIG. 12.

Referring to FIG. 12 and FIG. 13, the LCD 10' may include a lower display panel 100 and an upper display panel 200. The lower display panel 100 may include a pixel electrode 195 having a plurality of fine patterns 195b. The upper display panel 200 may include a common electrode 220, which is not patterned.

More specifically, a gate line 120 may be formed on a first substrate 110 and may extend in a row direction. One gate line 120 may be allocated for each pixel. A gate electrode 121 may protrude from the gate line 120. The gate line 120 and the gate electrode 121 may be collectively referred to as gate wiring.

The gate wiring 120 and 121 may be formed of an aluminum (Al)-based metal such as aluminum or an aluminum alloy, a silver (Ag)-based metal such as silver or a silver alloy, a copper (Cu)-based metal such as copper or a copper alloy, a molybdenum (Mo)-based metal such as molybdenum and a molybdenum alloy, chromium (Cr), titanium (Ti) or tantalum (Ta).

A gate insulating layer 130, which may be made of silicon nitride (SiNx) or silicon oxide, is formed on the gate wiring 120 and 121.

A semiconductor layer 140, which may be made of hydrogenated amorphous silicon or polysilicon, is formed on the gate insulating layer 130. The semiconductor layer 140 may be formed in various shapes such as an island shape or a linear shape. More specifically, referring to FIG. 13, the semiconductor layer 140 may be formed in an island shape on the gate electrode 121.

A data line 160, a source electrode 165, and a drain electrode 166 may be formed on the semiconductor layer 140 and the gate insulating layer 130. The data line 160 may extend in a column direction. The data line 160 may cross the gate line 120, thereby defining a pixel. The source electrode 165 may be branched off from the data line 160 and may extend over the semiconductor layer 140. The drain electrode 166 may be spaced apart from the source electrode 165, and it may be disposed on the semiconductor layer 140. The source electrode 165 and the drain electrode 166 may be disposed on opposite sides of the gate electrode 121. The drain electrode 166 may include a bar-shaped pattern disposed on the semiconductor layer 140 and an extension pattern having a larger area than the bar-shaped pattern. A contact hole 191 may be formed to expose the extension pattern of the drain electrode 166.

The data line 160, the source electrode 165, and the drain electrode 166 may be collectively referred to as data wiring.

The source electrode 165 may at least partially overlap the semiconductor layer 140. The drain electrode 166 may face the source electrode 165 and may at least partially overlap the semiconductor layer 140.

A color filter 170 may be formed on the data line 160 and the drain electrode 166. The color filter 170 may be formed of a photosensitive organic material such as photoresist. One of red, green, and blue filters may be provided for each pixel as the color filter 170, thereby realizing various color arrangements. The color filter 170 may have a uniform thickness or may have a step difference.

A black matrix 180 may be formed along the boundaries of the color filter 170. The black matrix 180 may serve as a light-shielding layer and may prevent light leakage. The black matrix 180 may be formed on a TFT having the gate electrode 121, the source electrode 165, and the drain electrode 166 as terminals. The black matrix 180 may be formed of an opaque material such as chromium. The black matrix 180 may improve picture quality by preventing light leakage. In order to maximize aperture ratio, the black matrix 180 may be formed to overlap the gate wiring 120 and 121 and/or the data wiring 160, 165 and 166.

A passivation layer 190 may be formed on the black matrix 180 and the color filter 170. The passivation layer 190 may be formed of an inorganic material, such as silicon nitride or silicon oxide, an organic material having excellent planarization and photosensitivity properties, or a low-k dielectric material obtained by plasma-enhanced chemical vapor deposition (PECVD) such as a-Si:C:O or a-Si:O:F. The passivation layer 190 may have a double-layer structure including an organic layer and an organic layer in order to offer the benefits of an organic layer and effectively protect the semiconductor layer 140.

The contact hole 191 may be formed through the passivation layer 190 and the color filter 170 to expose the drain electrode 166.

The pixel electrode 195 may be formed on the passivation layer 190, and may be electrically connected to the drain electrode 166 through the contact hole 191. That is, the pixel electrode 195 may be physically and electrically connected to the drain electrode 166 through the contact hole 191 to receive a data voltage from the drain electrode 166. The pixel electrode 195 may be formed of a transparent conductive material such as ITO or IZO.

The pixel electrode 195 may include a connection electrode 195a and the fine patterns 195b. The connection electrode 195a may be formed in the middle of a pixel, and the fine patterns 195b may be branched off from the connection electrode 195a in four directions. The fine patterns 195b may be formed by patterning a transparent conductive material such as ITO or IZO. The fine patterns 195b and may be formed in one body with the connection electrode 195a.

The fine patterns 195b may be branched off from the connection electrode 195a in four directions so as to define one or more domains. The four directions may be 90° apart from one another. A plurality of domain-dividing units 197 may be formed between the fine patterns 195b as slits.

The lower display panel 100 of the LCD 10' may include the pixel electrode 195, the color filter 170, and the black matrix 180.

The LCD 10' has a black matrix-on-array (BOA) structure in which a black matrix is formed on a TFT array. However, other structures may be used. For example, the LCD 10' may have a color filter-on-array structure in which a color filter is formed on a TFT array or may have an array-on-color filter (AOC) structure in which a TFT array is formed on a color filter.

The upper display panel 200 may include a second substrate 210 and a common electrode 220. The second substrate 210 may be formed of, for example, glass. The common electrode 220 may be a transparent electrode. The common electrode 220 may be formed in one body in a pixel region and may not be patterned at all. The common electrode 220 may generate an electric field together with the pixel electrode 195 and may thus rotate liquid crystal molecules 310.

A liquid crystal layer 300 may be interposed between the upper display panel 200 and the lower display panel 100. The liquid crystal layer 300 may include the liquid crystal molecules 310 and copolymers 320. The copolymers 320 may be formed by curing monomers under a set of conditions. For example, the copolymers 320 may be formed by injecting monomers into the liquid crystal layer 300, performing a primary curing operation on the monomers while applying an electric field to the liquid crystal layer 300, and performing a secondary curing operation on the monomers when no electric field is applied to the liquid crystal layer 300. The primary and secondary curing operations may both be performed while maintaining the temperature of the liquid crystal layer 300 below a phase transition temperature of the liquid crystal molecules 310.

The copolymers 320 may enable the liquid crystal molecules 310 to have a predetermined pretilt angle and may thus improve domain stability and the initial behavioral properties of the liquid crystal molecules 310. If the lower display panel 100 includes the pixel electrode 195 having the fine patterns 195b, a non-patterned electrode may be used as the common electrode 220, thereby preventing the problems associated with misalignment between the upper display panel 200 and the lower display panel 100.

The liquid crystal layer 300 may remain in a vertical alignment with respect to the first and second substrates 110 and 210 when no electric field is applied. On the other hand, the liquid crystal molecules 310 in the liquid crystal layer 300 may remain in a horizontal alignment with respect to the first and second substrates 110 and 210 when an electric field is applied.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display (LCD), the method comprising:
   forming a liquid crystal layer comprising liquid crystal molecules and monomers between a first substrate and a second substrate, the first substrate and second substrate facing each other;
   applying an electric field to the liquid crystal layer;
   performing, while the electric field is applied to the liquid crystal layer, a primary curing operation on the monomers;
   removing, after the primary curing operation is complete, the electric field; and
   performing, after removing the electric field, a secondary curing operation on remaining monomers,
   wherein at least one of the primary curing operation and the secondary curing operation comprises maintaining a temperature of the liquid crystal layer below a phase transition temperature of the liquid crystal molecules.

2. The method of claim 1, wherein at least one of the primary curing operation and the secondary curing operation comprises maintaining the temperature of the liquid crystal layer below 50° C.

3. The method of claim 1, wherein at least one of the primary curing operation and the secondary curing operation comprises maintaining the liquid crystal layer in a nematic phase.

4. The method of claim 1, wherein the primary curing operation comprises applying ultraviolet (UV) light or laser light, or applying heat.

5. The method of claim 1, wherein the secondary curing operation comprises applying ultraviolet (UV) light or laser light, or applying heat.

6. A method of fabricating a liquid crystal display (LCD), the method comprising:
   forming a liquid crystal layer comprising liquid crystal molecules and monomers between a first substrate and a second substrate, the first substrate and second substrate facing each other;
   applying an electric field to the liquid crystal layer;
   performing, while the electric field is applied to the liquid crystal layer, a primary curing operation on the monomers;
   removing, after the primary curing operation is complete, the electric field; and
   performing, after removing the electric field, a secondary curing operation on remaining monomers,
   wherein at least one of the primary curing operation and the secondary curing operation comprises maintaining the liquid crystal in a nematic state.

7. The method of claim 6, wherein at least one of the primary curing operation and the secondary curing operation comprises maintaining a temperature of the liquid crystal layer below a phase transition temperature of the liquid crystal molecules.

8. The method of claim 6, wherein at least one of the primary curing operation and the secondary curing operation comprises maintaining a temperature of the liquid crystal layer below 50° C.

9. The method of claim 6, wherein the primary curing operation comprises applying ultraviolet (UV) light or laser light, or applying heat.

10. The method of claim 6, wherein the secondary curing operation comprises applying ultraviolet (UV) light or laser light, or applying heat.

11. A liquid crystal display (LCD), comprising:
    a first substrate;
    a second substrate facing the first substrate; and
    a cured liquid crystal layer disposed between the first substrate and second substrate, the cured liquid crystal layer comprising liquid crystal molecules and copolymers but not comprising monomers,
    wherein the copolymers are obtained by
       applying an electric field to the liquid crystal layer,
       performing, while the electric field is applied to the liquid crystal layer, a primary curing operation on monomers in the liquid crystal layer,
       removing, after the primary curing operation is complete, the electric field, and
       performing, after removing the electric field, a secondary curing operation on remaining monomers in the liquid crystal layer, and
    wherein at least one of the primary curing operation and the secondary curing operation is performed while maintaining the liquid crystal layer in a nematic state.

12. The LCD of claim 11, wherein at least one of the primary curing operation and the secondary curing operation is performed while maintaining a temperature of the liquid crystal layer below a phase transition temperature of the liquid crystal molecules.

13. The LCD of claim 11, wherein at least one of the primary curing operation and the secondary curing operation is performed while maintaining a temperature of the liquid crystal layer below 50° C.

14. The LCD of claim 11, wherein the primary curing operation or the secondary curing operation is performed by applying ultraviolet (UV) light or laser light, or by applying heat.

15. The LCD of claim 11, wherein:
    the first substrate comprises a pixel electrode and a plurality of domain-dividing units; and
    the second substrate comprises a non-patterned common electrode.

16. The LCD of claim 15, wherein the pixel electrode comprises a plurality of fine patterns.

17. The LCD of claim 11, wherein the liquid crystal layer remains in a vertical alignment with respect to the first substrate and second substrate when no electric field is applied, and remains in a horizontal alignment with respect to the first substrate and second substrate when an electric field is applied.

* * * * *